Dec. 4, 1951  S. J. CARNES  2,577,402
FISH LURE
Filed Sept. 13, 1947
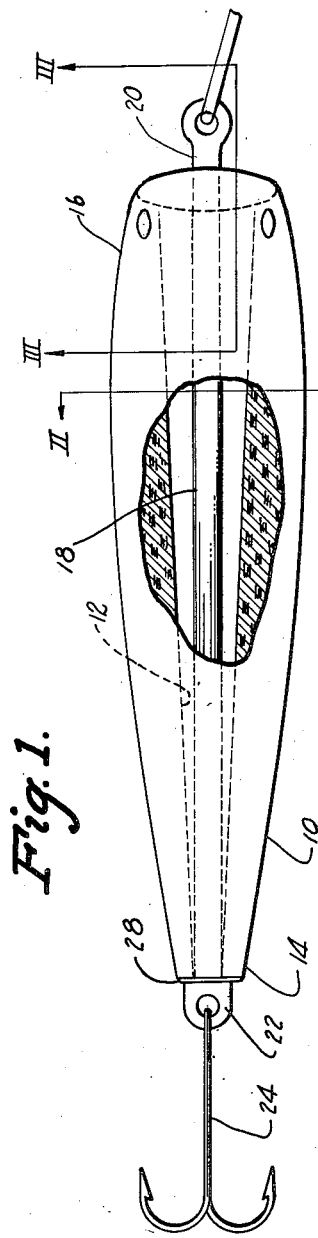
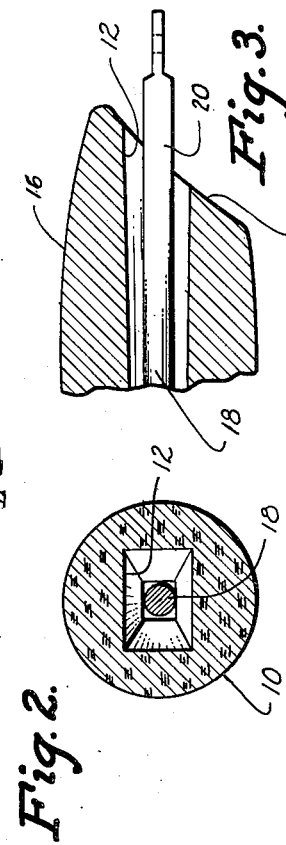
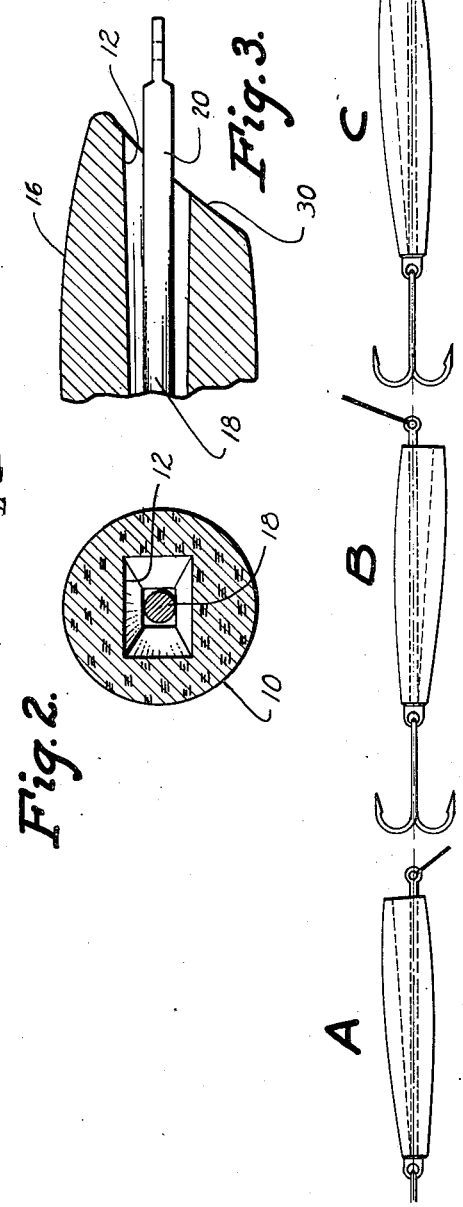
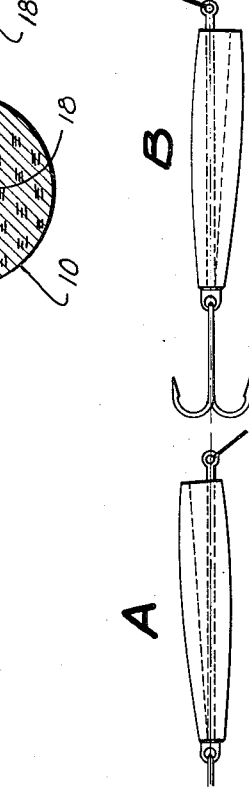
INVENTOR
Samuel J. Carnes
BY Louis Necho
ATTORNEY

Patented Dec. 4, 1951

2,577,402

UNITED STATES PATENT OFFICE 2,577,402

FISH LURE

Samuel J. Carnes, Camden, Ark.

Application September 13, 1947, Serial No. 773,778

1 Claim. (Cl. 43—42.36)

My invention relates to a fish lure of the type which simulates a bait fish, such as a minnow and which is cast out and then intermittently reeled in to attract the attention of game fish.

The main object of the invention is to produce an improved fish lure of the type set forth.

In casting a bait or a lure, it is desirable, when reeling in, to traverse, or scan, as large an area as possible so as to attract the attention of fish from as remote points as possible and thus correspondingly increase the chances of success.

It is therefore a further object of the invention to produce an improved lure which, as it is intermittently reeled in, will follow a relatively wide zig zag course and will thus scan a larger area than it would if the lure were to move in a substantially straight path toward the fisherman.

A still further object is to produce a lure which will follow a zig zag path without the aid of extraneous mechanical devices and one which can be manufactured and sold at little, if any, additional cost as compared with conventional lures of this type.

A still further object of the invention is to produce a lure which will operate wholly automatically without any attention or skill on the part of the fisherman.

These and other objects will be understood from the following specification and the accompanying drawings in which:

Fig. 1 is a top plan view of a fish lure embodying my invention.

Fig. 2 is a section on line II—II of Fig. 1.

Fig. 3 is a fragmentary sectional view taken on line III—III on Fig. 1.

Fig. 4 is a diagrammatic view illustrating the manner in which the lure operates.

The lure embodying my invention includes a body 10 which is made of wood, composition, or other suitable material and which is shaped to simulate the appearance of a minnow or other bait fish.

According to my invention, the body 10 is provided with an internal bore 12 which is substantially rectangular or oval in transverse section and which tapers from the front end 16 towards the rear end 14 of the lure as will be seen from Figs. 1 and 2.

A bar 18 extends loosely thru the bore 12 and is long enough so that one end 20 thereof projects beyond the front end of the lure and the other end 22 thereof extends beyond the rear end of the lure. The opposite ends of the bar 18 are apertured or are provided with other engaging means whereby a hook 24 is attached to the rear end 22 of the bar and a fishing line is attached to the front end 20 of the bar 18. The opposite ends of the bar are enlarged or otherwise prevented from passing through the lure. As will be seen from Fig. 1, the rear end 22 of the bar 18 is enlarged and is provided with a washer 28 which is too big to pass through the reduced end of bore 12 and the enlarged eye to which fishing line is secured is also too large to pass through the smaller end of the bore 12. In practice, movement of the bar 18 to the left of the lure as viewed in Fig. 1 never takes place because the fishing line 26 is normally held taut.

The front end 14 of the lure is inclined relative to the axis of the bore 12 to produce an oval, concave recess 30 as shown in Fig. 3. The lure may be provided with dorsal or lateral barbed hooks if so desired.

However, when a lure made according to my invention is cast out, and as the fisherman intermittently reels the line in, the lure will move towards the fisherman along a zig zag course. Thus when the lure is at rest in position A, the bar 18 will form one angle with the axis of the bore 12 and, when the fisherman pulls on the line, the bar 18 will form another angle with the axis of the bore. When the lure again comes to rest in position C, the bar, due to the constantly changing components of force and currents will form still another angle with the axis of the bore. Therefore every time the lure is pulled toward the fisherman, its initial movement will be at an angle to the direction of the pull because the pressures exerted on the surfaces of the bore will vary according to the angle formed between the axis of bar 18 and the axis of the bore 12.

This is due to the provision of the oval tapered bore the large end of which faces the direction of movement of the lure, the bar 12 passing loosely through the bore 12, and the fact that the lure is not pulled by the line but is pushed by the tail end 22 of the bar 18 in response to a tug on the fishing line. By this arrangement, except in the almost non-existent situation when the axis of the bar 18 and the axis of lure coincide when the lure comes to rest between pulls on the line, the lure will move in a direction at an angle to the direction of the pull on the line. The pushing action of the tail end 22 of the bar 18 against the tail end of a lure when the body of the lure is not coaxial with the bar will tend to bring the lure into coaxial position but because at the beginning of the pull the lure was not coaxial with the bar, the water pressure on the portions of the interior of the bore to either side of the axis of the bar will be unequal, at least initially, and the lure will move at an angle to the direction of the axis of the bar at least until the water resistance has been equalized. Since after each short reeling in of the fishing line, the lure and the bar come to rest, and since the bar will probably come to rest before the lure does so, the chances of the axes of the lure and of the bar ever coinciding are practical nill. This insures constant zig zagging of the lure with the intermittent reeling in of the line.

In Fig. 4, due to lack of space, the zig zag movement of the lure is shown on a reduced scale but it will be understood that, as the lure is intermittently pulled toward the fisherman, the lure will move at a considerable angle to one side or the other of said line and will thus follow a relatively wide zig zag course. In actual practice, a lure built according to my invention will deviate, in alternate directions, as much as twenty four to thirty six inches and will attract fish from a relatively wider area.

It will thus be seen that I have produced an improved lure which makes for more successful fishing by attracting fish over a relatively large area, that such lure does not differ in appearance from conventional lures, that it is fully automatic in its operation so that no skill or effort is required on the part of the fisherman, and that the lure can be made for little, if any, additional expense over and above the cost of comparable, conventional lures.

The form of the bore 12 and the loose mounting of the bar 18 coact in producing the zig zag movement of the lure because as the fishing line tugs at the end 20 of the bar 18, the body of the lure is tilted and the pull transmitted to the end 22 of the bar pushes the lure forward. Due to the tilt of the body of the lure, as it is being pushed through the water, the water pressure will be greater upon one side of the bore 12 than it will be on the other. When the lure again comes to rest, and when the fisherman again pulls on the line to cause the end 22 or the washer 26 to propel the lure toward the fisherman, the body of the lure will be tilted in the opposite direction, the water pressure will be reversed and the lure will move in the opposite direction.

What I claim is:

A fishing lure comprising a buoyant body of greater length than width and provided with a front face inclined at an angle to the longitudinal axis thereof, said body having a substantially rectangular bore which tapers from the front to the rear end of the lure with the smaller end of the bore at the rear end of the lure and the larger end of the bore at the front end of the lure, a bar extended through said bore and having a cross section smaller than the width of the bore at its smaller end, a combined eye and washer secured to the rear end of said bar and adapted to have a hook secured thereto, said washer being adapted to abut the body of the lure at the rear end thereof, and an enlargement at the front end of said bar and having an opening therein adapted to have a fishing line secured thereto, whereby the bar is capable of swinging laterally within the bore and is capable of moving longitudinally thereof but is prevented from disengagement from the bore by said washer and said enlargement.

SAMUEL J. CARNES.

REFERENCES CITED

The following references are of record in the file of this patent:

UNITED STATES PATENTS

| Number | Name | Date |
| --- | --- | --- |
| 664,476 | Hall | Dec. 25, 1900 |
| 923,670 | Lockhart | June 1, 1909 |
| 1,232,167 | Arnold | July 3, 1917 |
| 1,295,448 | Dingwell | Feb. 25, 1919 |
| 1,390,458 | Moree | Sept. 13, 1921 |
| 1,599,763 | Head | Sept. 14, 1926 |
| 2,140,724 | Stefan | Dec. 20, 1938 |
| 2,152,275 | Parkins | Mar. 28, 1939 |
| 2,387,255 | Godlewski | Oct. 23, 1945 |